United States Patent [19]
Frank

[11] 4,385,652
[45] May 31, 1983

[54] ENDLESS TRACK CONSTRUCTION

[76] Inventor: Ronald M. Frank, Box 6, Group 13, S.S. #1, Winnipeg, Manitoba, Canada, R3C 2E8

[21] Appl. No.: 199,051

[22] Filed: Oct. 20, 1980

[51] Int. Cl.³ .................................................. B60C 27/08
[52] U.S. Cl. ...................................... 152/187; 152/191; 152/226; 152/230; 305/45; 305/53; 305/55
[58] Field of Search ...................... 152/185.1, 187, 190, 152/191, 225 R, 225 C, 226–230, 209 B, 210, 189, 180, 179, 178; 305/19, 39, 45, 53, 55

[56] References Cited
U.S. PATENT DOCUMENTS

| 967,779 | 8/1910 | Jasmer | 152/225 C |
|---|---|---|---|
| 1,142,905 | 6/1915 | Morris | 152/181 |
| 1,468,204 | 9/1923 | Horton | 152/185.1 |
| 3,435,873 | 4/1969 | Weier | 152/185.1 |

FOREIGN PATENT DOCUMENTS 852419 10/1960 United Kingdom ................ 152/187

*Primary Examiner*—Michael W. Ball
*Attorney, Agent, or Firm*—Stanley G. Ade

[57] ABSTRACT

A plurality of sections are fitted together so that they fit around an uninflated tire and they are fastened together to form a rigid cylinder. The tire is then inflated thus holding the now solid rim or track in position. Each section includes a curved base and a ground-surface engaging projection extending therefrom. The curved base includes a planar plate portion at one end and a trailing jaw portion at the other end. The plate portion of one section engages the jaw portion of the next adjacent section and the jaws are then closed over the plate and a fastener such as a rivet or the like, is placed through the jaws and through the plate thus forming the rigid connection. There is room provided in the engagement of the plate with the jaws to adjust the sections before fastening same so that the desired diameter of the finished rim or track may be obtained.

14 Claims, 5 Drawing Figures

ENDLESS TRACK CONSTRUCTION

BACKGROUND OF THE INVENTION

This invention relates to new and useful improvements in endless track constructions designed primarily for use on snow throwers and the like which normally include a pair of inflated tires. In order to obtain traction, conventional tire chains are often engaged loosely around these tires. However, these chains are somewhat difficult to install and to retain because of the relatively small diameter of the tire.

Although the device is designed primarily for use with relatively small machines such as snow throwers and the like, nevertheless it will be appreciated that it can be used on other machines such as garden tractors or the like which require additional gripping power for the pneumatic tired wheels utilized thereby.

SUMMARY OF THE INVENTION

In accordance with the invention there is provided a substantially cylindrical, endless track assembly engageable around an inflatable tire for use on wheel supported structures such as snowblowers, vehicles and the like; comprising in combination a plurality of sections substantially rigidly connected together to form a rim or track surrounding the associated tire, each section including a substantially rectangular base curved to conform substantially with the curvature of the perimeter of the associated tire, traction means extending from the outer side of said base and means to connect said sections together in a substantially rigid relationship with one another.

In accordance with a further aspect of the invention, there is provided a method of forming a substantially rigid rim or track for a pneumatic tire mounted upon a wheel consisting of the steps of extruding a length of rim or track material having a base with a plate portion on one end and a jaw portion on the other end, and traction means extending from the outer side of said base intermediate said portions, cutting said length into sections having a width substantially equal to the width of the tread of the tire upon which said rim or track is to be fitted, roll forming the base to a curvature substantially equal to the curvature of the perimeter of the tire upon which said rim or track is to be fitted, engaging a plurality of sections together to form a cylindrical rim or track by engaging the plate portion of one section with the jaw portion of the next adjacent section, adjusting the angular relationship between the sections to obtain the desired inner diameter of the rim or track and securing the sections together in substantially rigid relationship with one another.

One of the advantages of the present invention is the fact that the individual sections are easily assembled together and adjusted in their relationship one with the other so that they fit tightly around the tire when uninflated. The sections are rigidly connected together by rivets, nut and bolt assemblies or the like to form a rigid cylinder which is engaged over the uninflated tire. The tire may then be inflated to its normal pressure thus holding the rigid rim firmly in position and providing excellent traction under normal snow or mud conditions without the noise often associated with chains or the undesirable disengagement of said chains from the wheel in use.

Another advantage of the present invention is to provide a device of the character herewithin described which, once formed for a given set of tires, is easily installed and replaced as desired.

Still another advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 5:
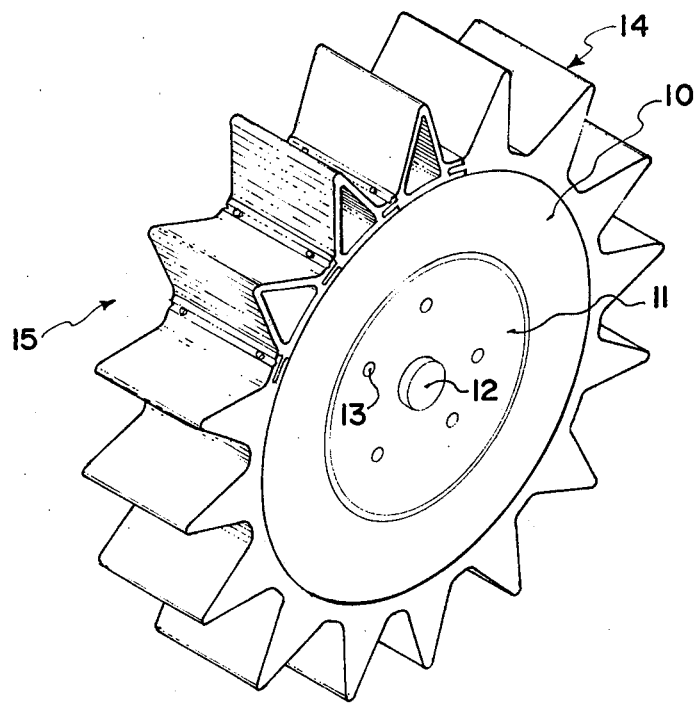
FIG. 5 is an isometric view of a wheel and rim with the track engaged thereon.

Proceeding therefore to describe the invention in detail, reference should first be made to FIG. 5 in which 10 illustrates a conventional pneumatic tire engaged upon a rim 11 having a central axle aperture 12 and wheel bolt apertures 13 all of which are conventional.

The invention collectively designated 14, when installed upon the wheel as shown in FIG. 5, consists of a substantially rigid cylinder extending substantially the width of the tire and being formed from a plurality of sections collectively designated 15 shown in detail in the remaining figures.

The sections are preferably formed by extruding a length of section material from aluminum or other suitable material and then cutting the length of material into shorter sections, the width of each section being substantially equal to the width of the tire tread upon which the finished track is to be installed. However, other methods of manufacture can be utilized.

Each individual section 15 consists of a substantially rectangular base 16 having a centre section 16′ with a plate portion 17 extending from one end of the centre section and a jaw assembly collectively designated 18 extending from the opposite end of the centre section. The jaw assembly includes the base jaw portion 19 which is formed as an extension of the centre section 16′ and an upper jaw portion 20 which, when formed, diverges from the inner end 21 thereof, outwardly and upwardly with relation to the base jaw portion 19 as clearly shown in FIG. 1.

Figure 1:
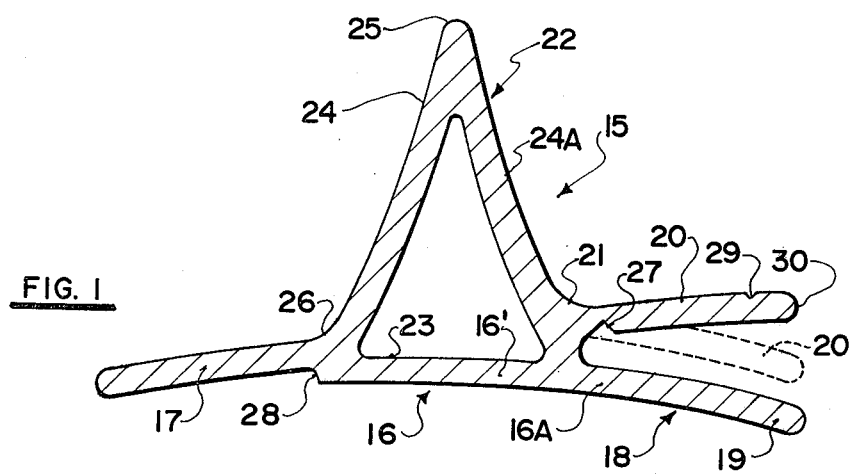
FIG. 1 is a side elevation of one of the sections per se.
Figure 2:
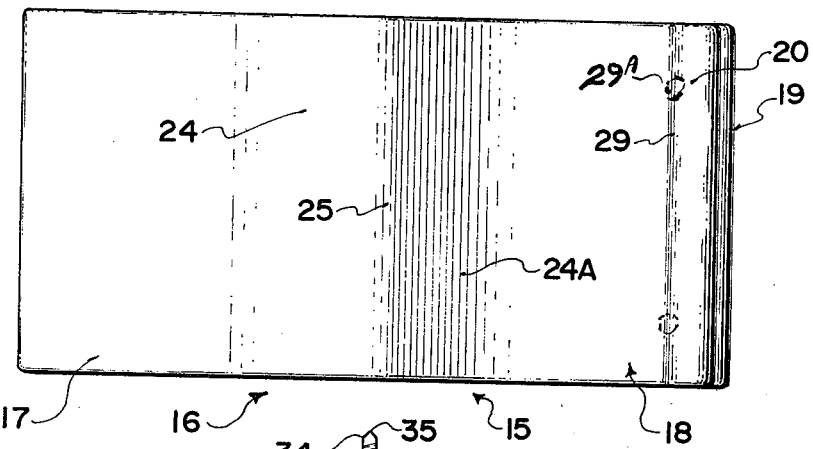
FIG. 2 is a top plan view of FIG. 1.

Traction means collectively designated 22 extends from the outer face 23 of the base 16 and in the present embodiment, the traction means consists of a pair of substantially rectangular flanges 24 extending the full width of the base and extending from the outer surface 23 one adjacent each end of the centre section 16′ and converging inwardly and upwardly to a common apex 25 as clearly shown in FIGS. 1 and 2.

In order to increase the angle of attack of the gripping end of these cleats or traction flanges, it is preferable that the flanges be concave on the outer surface said concavity extending from adjacent the bases 26 thereof towards the apex 25.

Although these cleats or traction means are shown as being hollow, nevertheless it will be appreciated, that they can be solid if desired. They can also be of other configurations, if desired.

The base 16 is also concavo-convex from one end to the other with the radius of the underside concavity 16A being substantially equal to the radius of curvature of the tire tread around which the device is to be engaged. This is preferably done by roll forming after the sections have been formed, but of course, it will be appreciated that this concavo-convex configuration can be formed when the sections are extruded.

The aforementioned upper jaw 20 extends from adjacent the base of one flange 24A of the cleat or traction means 22 and this upper jaw is capable of being moved downwardly or bent to the position shown in phantom in FIG. 1 so that it is substantially parallel with the lower jaw 19. To facilitate this bending movement, a groove 27 is formed on the underside of the upper jaw 20 adjacent the root thereof as clearly shown.

A transversely extending ledge or shoulder 28 is formed across the underside of the base adjacent the junction between the centre section 16' thereof and the plate portion 17 and a drilling groove 29 is formed in the upper surface of the upper jaw 20, transversely thereacross, adjacent the distal end 30 thereof, the purpose of which will be hereinafter described.

As mentioned previously, the individual sections are preferably either formed by die-casting or any other conventional means or may be formed by extrusion with a planar base and cut-off to the desired width and then roll formed to the desired curvature to take up the form illustrated in FIG. 1.

To form the finished rim or track, the sections are engaged together by the insertion of the plate portion 17 of the base of one section, between the diverging jaws 19 and 20 of the next adjacent section whereupon the upper jaw portion 30 is bent downwardly to the position shown in phantom in FIG. 1 thus clamping the two sections together. Drill holes may be provided through the transverse groove 29, through the plate portion engaged between the jaws and through the lower jaw portion 19 whereupon one or more rivets 29B, nut and bolt assemblies or other fastening means may be engaged therethrough thus clamping the two sections rigidly together.

The entire cylindrical rim is built up in this way so that it just freely engages over the tire 10 when in the uninflated condition.

It will be noted that the lower jaw 19 of one section engages the underside of plate portion 17 of the adjacent section and abuts adjacent to the ledge 28 so that a relatively smooth undersurface results.

The final assembly of the endless track may be adjusted as to its finished diameter by the adjustment of the position of the plate portions 17 with the jaw portions 29 and 30 of the adjacent sections prior to the drilling and securement of the sections together.

This forms a rigid cylindrical rim or track which, as hereinbefore described, may be engaged over the uninflated tire. The tire is then inflated to the normal operating pressure thus holding the rim or track firmly in position with slippage between the two being prevented by the frictional engagement of the rim (and/or protrusion of rivets, nut and bolt assemblies or the like) with the tread of the pneumatic tire.

Figure 3:
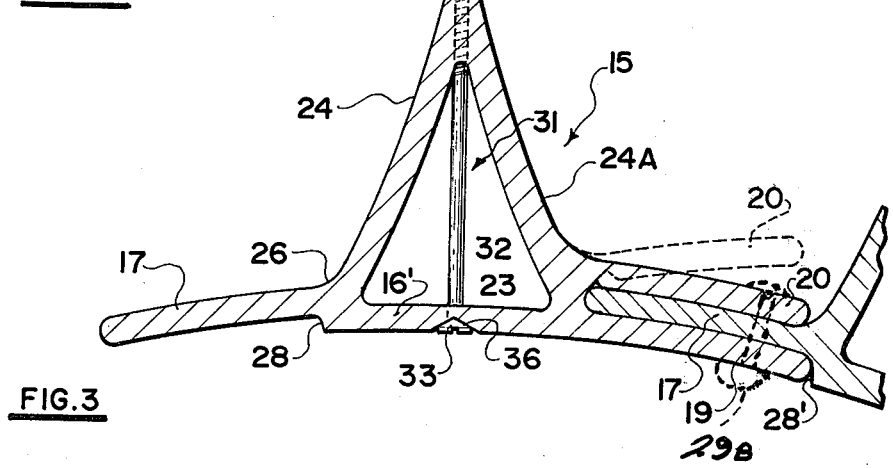
FIG. 3 is a vertical section of FIG. 1 showing a stud engaged therewith.
Figure 4:
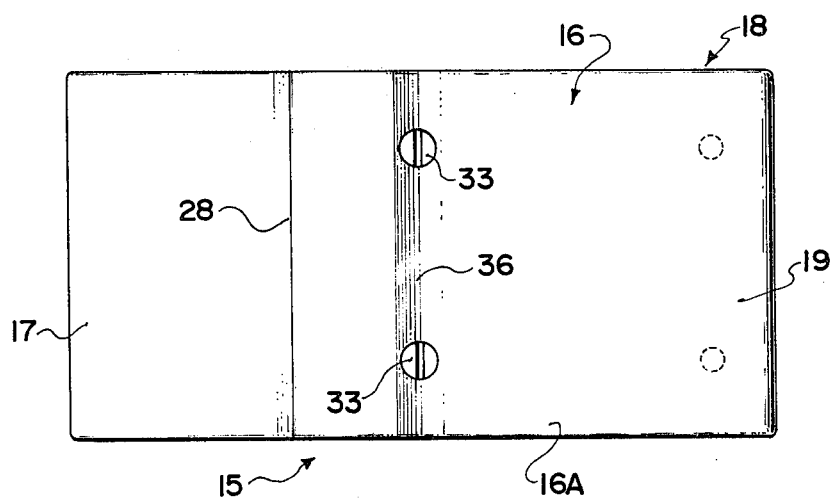
FIG. 4 is an underside view of FIG. 3.

If used under ice conditions, one or more studs collectively designated 31, may be used on each or on alternate sections and FIGS. 3 and 4 show details of such studs. They include an elongated shank portion 32 having a cone-shaped head 33 on one end and being screw threaded part way along the length thereof. In the present embodiment, this screw threading is adjacent the distal end 34 which may be end pointed as at 35 if desired.

A transverse groove 36 is formed across the concave surface 16A of the centre section intermediate the ends thereof, said groove being formed during the manufacture of the sections and drill holes are formed through the centre section, using the groove 36 as a guide and through the apices 25 of the cleats 22. The drilling through the apex of each section is then screw threaded and is screw threadably engaged by the screw threaded portion on the end of the shank 31. They are screwed into position so that the conical inner ends 33 are flush with the surface 16A and the pointed end extends beyond the apex as clearly shown in FIG. 3.

These extending pointed ends tend to bite into the ice surface and give additional traction under adverse conditions.

Once the rims or tracks have been formed for individual tires, they are easily removed and installed by inflating and then inflating the tire as hereinbefore described.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A substantially cylindrical, endless track assembly engageable around an inflatable tire for use on wheel supported structures such as snowblowers, vehicles and the like; comprising in combination a plurality of sections substantially rigidly connected together to form a rim or track surrounding the associated tire, each section including a substantially rectangular base curved to conform substantially with the curvature of the perimeter of the associated tire, traction means extending from the outer side of said base and means to connect said sections together in a substantially rigid relationship with one another, said traction means including a cleat extending from said base substantially perpendicular thereto and situated intermediate the ends thereof, said cleat including a pair of flanges extending from the outer surface of said base in spaced apart relationship and converging towards a common apex, the outer surfaces of said flanges being concave from the base thereof towards said common apex.

2. The invention according to claim 1 which includes at least one stud component extending from said apex of said flanges.

3. The invention according to claim 1 in which said bases are concavo-convex with the concave side engaging with the associated tire perimeter and said traction means extending from said convex side.

4. The invention according to claim 3 which includes at least one stud component extending from said apex of said flanges.

5. The invention according to claim 2 in which said means to connect said sections together including one end of said base having a substantially planar plate portion and the other end of said base constituting an inner jaw portion, an outer jaw portion extending from said section from a point spaced inwardly from the outer end of said inner jaw portion, the plate portion of one section being engageable between the jaw portions of the section adjacent thereto, and means extending through said jaw portions and said plate portion engaged thereby, to clamp said sections together in said substantially rigid relationship with one another.

6. The invention according to claim 5 in which said outer jaw portion is formed in diverging relationship with said inner jaw portion and is bendable to a substantially parallel relationship with said inner jaw portion when said plate portion is engaged therebetween, and means on the underside of said outer jaw portion adjacent the inner end thereof, to facilitate the bending thereof towards said inner jaw portion, and tire tread gripping means formed transversely across the inner surface of said base.

7. The invention according to claim 6 which includes at least one stud component extending from said apex of said flanges.

8. The invention according to claim 5 which includes at least one stud component extending from said apex of said flanges.

9. The invention according to claim 11, 8 or 7 in which said stud includes a screw threaded element engaging through said base and through said apex and being screw threadably engageable with said section to secure said element therein, the distal end of said element extending beyond said apex and being substantially end pointed.

10. The invention according to claim 1 in which said means to connect said sections together including one end of said base having a substantially planar plate portion and the other end of said base constituting an inner jaw portion, an outer jaw portion extending from said section from a point spaced inwardly from the outer end of said inner jaw portion, the plate portion of one section being engageable between the jaw portions of the section adjacent thereto, and means extending through said jaw portions and said plate portion engaged thereby, to clamp said sections together in said substantially rigid relationship with one another.

11. The invention according to claim 10 which includes at least one stud component extending from said apex of said flanges.

12. The invention according to claim 10 in which said outer jaw portion is formed in diverging relationship with said inner jaw portion and is bendable to a substantially parallel relationship with said inner jaw portion when said plate portion is engaged therebetween, and means on the underside of said outer jaw portion adjacent the inner end thereof, to facilitate the bending thereof towards said inner jaw portion, and tire tread gripping means formed transversely across the inner surface of said base.

13. The invention according to claim 12 which includes at least one stud component extending from said apex of said flanges.

14. The invention according to claims 2, 4 or 13 in which said stud includes a screw threaded element engaging through said base and through said apex and being screw threadably engageable with said section to secure said element therein, the distal end of said element extending beyond said apex and being substantially end pointed.

* * * * *